US012347978B2

(12) United States Patent
Nord et al.

(10) Patent No.: US 12,347,978 B2
(45) Date of Patent: Jul. 1, 2025

(54) OVERMOLD-OVERMOLD MICRO RADIO FREQUENCY CONNECTOR

(71) Applicant: Raytheon Company, Waltham, MA (US)

(72) Inventors: Ian E. Nord, Dallas, TX (US); Joseph P. Nipper, Allen, TX (US); Mikel J. White, Murphy, TX (US)

(73) Assignee: RAYTHEON COMPANY, Waltham, MA (US)

( * ) Notice: Subject to any disclaimer, the term of this patent is extended or adjusted under 35 U.S.C. 154(b) by 581 days.

(21) Appl. No.: 17/866,926

(22) Filed: Jul. 18, 2022

(65) Prior Publication Data

US 2024/0022027 A1 Jan. 18, 2024

(51) Int. Cl.

| | |
|---|---|
| ***H01R 13/00*** | (2006.01) |
| ***H01R 12/71*** | (2011.01) |
| ***H01R 13/50*** | (2006.01) |
| ***H01R 13/6588*** | (2011.01) |
| ***H01R 43/20*** | (2006.01) |
| ***H01R 43/24*** | (2006.01) |
| *H01R 13/6599* | (2011.01) |

(52) U.S. Cl.
CPC ....... *H01R 13/6588* (2013.01); *H01R 12/716* (2013.01); *H01R 13/50* (2013.01); *H01R 43/205* (2013.01); *H01R 43/24* (2013.01); *H01R 13/6599* (2013.01)

(58) Field of Classification Search
CPC .... H01R 12/716; H01R 13/50; H01R 43/205; H01R 43/24
See application file for complete search history.

(56) References Cited

U.S. PATENT DOCUMENTS

| | | | | |
|---|---|---|---|---|
| 2,750,572 A * | 6/1956 | Fox | H01R 13/28 220/8 |
| 9,923,293 B2 | 3/2018 | Swernofsky et al. | |
| 2005/0090137 A1* | 4/2005 | Gottlieb | H05K 1/0254 439/342 |
| 2017/0047686 A1* | 2/2017 | Wig | H01R 13/6471 |
| 2018/0219313 A1* | 8/2018 | Sauer | H01R 12/716 |
| 2018/0276176 A1* | 9/2018 | Wig | G06F 13/4282 |
| 2018/0376581 A1* | 12/2018 | Fujioka | H05K 1/0228 |
| 2024/0022027 A1* | 1/2024 | Nord | H01R 12/73 |

* cited by examiner

*Primary Examiner* — Phuong Chi Thi Nguyen
(74) *Attorney, Agent, or Firm* — CANTOR COLBURN LLP

(57) ABSTRACT

A connector is provided and includes one or more radio frequency (RF) signal pins, ground pins arranged in a ring-shape around the one or more RF signal pins, a ground pin supporting mold formed about the ground pins and defining a borehole around the one or more RF signal pins and a dielectric mold formed in the borehole about the one or more RF signal pins and about the ground pin supporting mold.

20 Claims, 8 Drawing Sheets

OVERMOLD-OVERMOLD MICRO RADIO FREQUENCY CONNECTOR

BACKGROUND

The following description relates to connectors and, more specifically, to an overmold-overmold micro radio frequency (RF) connector.

In certain electrical applications, printed circuit boards (PCBs) are arranged in a stack. Spaces between the PCBs are referred to as board gaps. Each PCB can have electrical devices attached to it for executing various electrical operations. Connectors, such as RF connectors or other similar connectors, can be interposed between neighboring ones of the PCBs to allow for signals, such as RF signals and other types of signals, to move between the PCBs.

Often, there is a need to move multiple RF signals between the PCBs in a stack with a capability of holding a 50-ohm transition. In these or other cases, there are competing needs to move the multiple RF signals between the PCBs by way of a connector that has a small footprint and can be designed for varying board gaps. There may also be an additional need to move digital signals within or by way of the same connector.

Existing connector solutions that can hold a 50-ohm transition through varying lengths do not have a small enough footprint and cannot also carry digital signals, such as in the case of sub-miniature push-on, micro (SMPM) connectors. On the other hand, existing connector solutions that can carry RF and digital signals with a small enough footprint typically use a coaxial ground cage that creates resonances at longer coax lengths. The connector solutions also cannot hold a 50-ohm transition through varying lengths.

BRIEF DESCRIPTION

According to an aspect of the disclosure, a connector is provided and includes one or more radio frequency (RF) signal pins, ground pins arranged in a ring-shape around the one or more RF signal pins, a ground pin supporting mold formed about the ground pins and defining a borehole around the one or more RF signal pins and a dielectric mold formed in the borehole about the one or more RF signal pins and about the ground pin supporting mold.

In accordance with additional or alternative embodiments, respective dimensions of the one or more RF signal pins, the ground pins, the conductive mold and the dielectric mold are sized to provide for a desired impedance transition.

In accordance with additional or alternative embodiments, the connector further includes digital signal pins at an exterior of the ring-shape and the dielectric mold is formed about the digital signal pins.

In accordance with additional or alternative embodiments, the ground pin supporting mold includes at least one a conductive polymeric material and a conductive powder material in a dielectric matrix.

In accordance with additional or alternative embodiments, the ground pin supporting mold is formed to define cutouts for a flow of material of the dielectric mold.

In accordance with additional or alternative embodiments, the connector further includes plating on an interior surface of the borehole.

According to an aspect of the disclosure, an electrical transition is provided and includes first and second printed circuit boards (PCBs) and a connector disposed to provide a desired impedance transition between the first and second PCBs. The connector includes radio frequency (RF) signal pins extending at least partially between the first and second PCBs, groups of ground pins extending at least partially between the first and second PCBs, each group of ground pins being arranged in a ring-shape around a corresponding one of the RF signal pins, a ground pin supporting mold formed about each ground pin of each of the groups of the ground pins and defining a borehole around each one of the RF signal pins and a dielectric mold formed in each borehole about the corresponding one of the RF signal pins and about the ground pin supporting mold.

In accordance with additional or alternative embodiments, the respective dimensions of the RF signal pins, the ground pins, the ground pin supporting mold and the dielectric mold are sized to provide for the desired impedance transition.

In accordance with additional or alternative embodiments, the connector further includes digital signal pins at an exterior of each of the ring-shapes and the dielectric mold is formed about the digital signal pins.

In accordance with additional or alternative embodiments, the ground pin supporting mold includes at least one of conductive polymeric material and a conductive powder material in a dielectric matrix.

In accordance with additional or alternative embodiments, the ground pin supporting mold is formed to define cutouts for a flow of material of the dielectric mold.

In accordance with additional or alternative embodiments, the connector further includes plating on an interior surface of each borehole.

In accordance with additional or alternative embodiments, the electrical transition further includes an additional connector assembly electrically interposed between the first and second PCBs.

According to an aspect of the disclosure, a method of forming a connector is provided and includes arranging ground pins in a ring-shapes around radio frequency (RF) signal pins, forming a ground pin supporting mold about the ground pins to define boreholes around each of the RF signal pins and forming a dielectric mold in the boreholes about each of the RF signal pins and about the ground pin supporting mold.

In accordance with additional or alternative embodiments, the method further includes arranging digital signal pins at an exterior of the ring-shape and forming the dielectric mold about the digital signal pins.

In accordance with additional or alternative embodiments, the ground pin supporting mold includes at least one of conductive polymeric material and a conductive powder material in a dielectric matrix.

In accordance with additional or alternative embodiments, the forming of the ground pin supporting mold and the forming of the dielectric mode includes injection molding.

In accordance with additional or alternative embodiments, the injection molding includes forming the ground pin supporting mold in separate portions and plating an interior surface of the borehole.

According to an aspect of the disclosure, a method of assembling an electrical transition is provided and includes forming the connector and disposing the connector to provide a desired impedance transition between first and second printed circuit boards (PCBs).

In accordance with additional or alternative embodiments, the method further includes electrically interposing an additional connector assembly between the first and second PCBs.

These and other advantages and features will become more apparent from the following description taken in conjunction with the drawings.

BRIEF DESCRIPTION OF THE DRAWINGS

The subject matter, which is regarded as the disclosure, is particularly pointed out and distinctly claimed in the claims at the conclusion of the specification. The foregoing and other features and advantages of the disclosure are apparent from the following detailed description taken in conjunction with the accompanying drawings in which:

DETAILED DESCRIPTION

As will be described below, an overmold-overmold connector is provided that allows for the creation of a 50-ohm RF transition. The overmold-overmold connector is formed by a performance of two different molding operations. The first molding operation is executed with a conductive plastic, and is followed by a second molding operation that is executed with a dielectric. The resulting overmold-overmold connector body allows for a compact size with an elongated ground connection and a desired RF transition capability.

Figure 1:
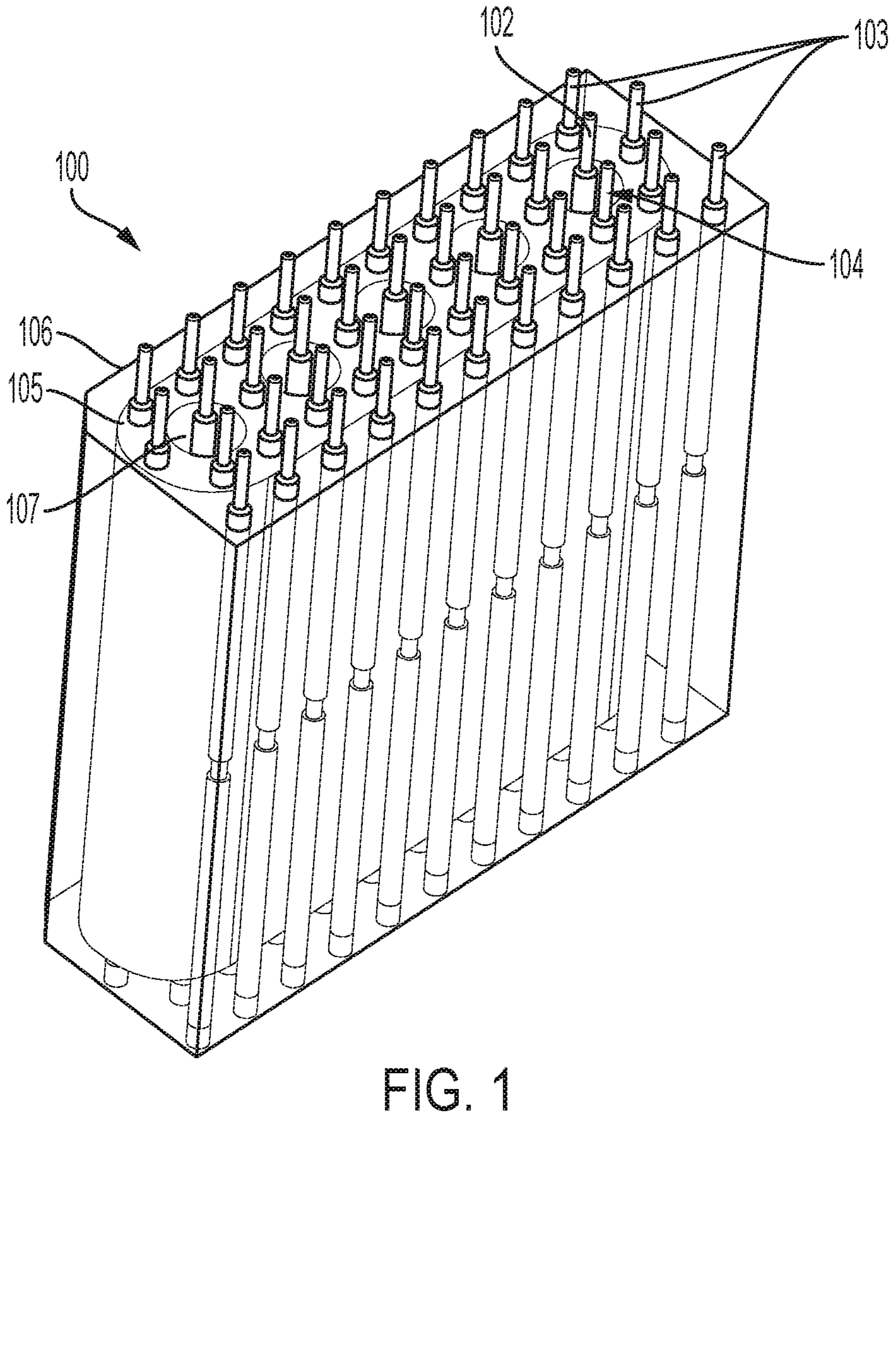
FIG. 1 is a perspective view of a connector in accordance with embodiments.
Figure 2:
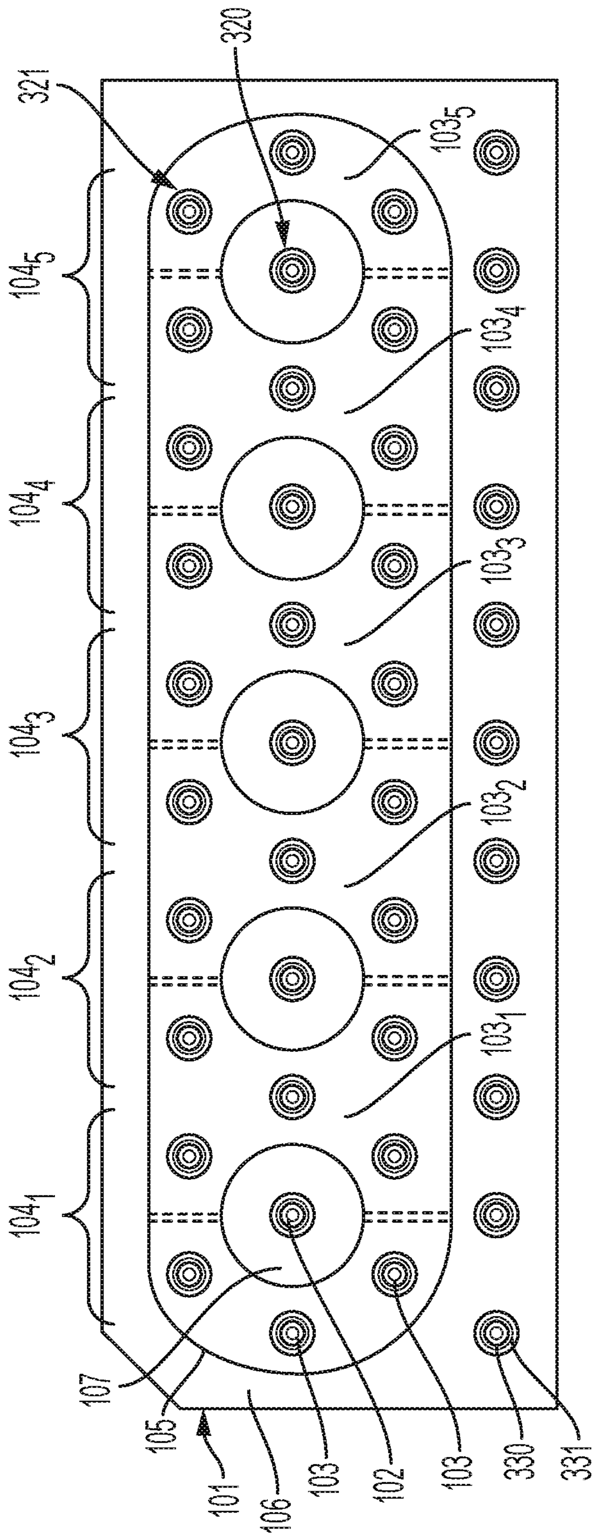
FIG. 2 is an axial view of the connector of FIG. 1 in accordance with embodiments.

With reference to FIGS. 1 and 2, a connector 101 is provided and includes one or more RF signal pins 102 (hereinafter referred to as an "RF signal pin 102" for clarity and brevity), ground pins 103 arranged in a ring-shape 104 around the RF signal pin 102, a ground pin supporting mold 105 and a dielectric mold 106. The ground pin supporting mold 105 can be formed of conductive material or can be formed in a manner which allows conductive material to be added to it. In any case, the ground pin supporting mold 105 is formed about the ground pins 103 and defines a borehole 107 around the RF signal pin 102. The dielectric mold 106 is formed in the borehole 107 about the RF signal pin 102 and about the ground pin supporting mold 105. In accordance with embodiments, respective dimensions of the RF signal pin 102, the ground pins 103, the ground pin supporting mold 105 and the dielectric mold 106 are sized to provide for any desired impedance transition, such as a 50-ohm transition, between, for example, printed circuit boards (PCBs) as will be described below with reference to FIG. 3.

Figure 3:
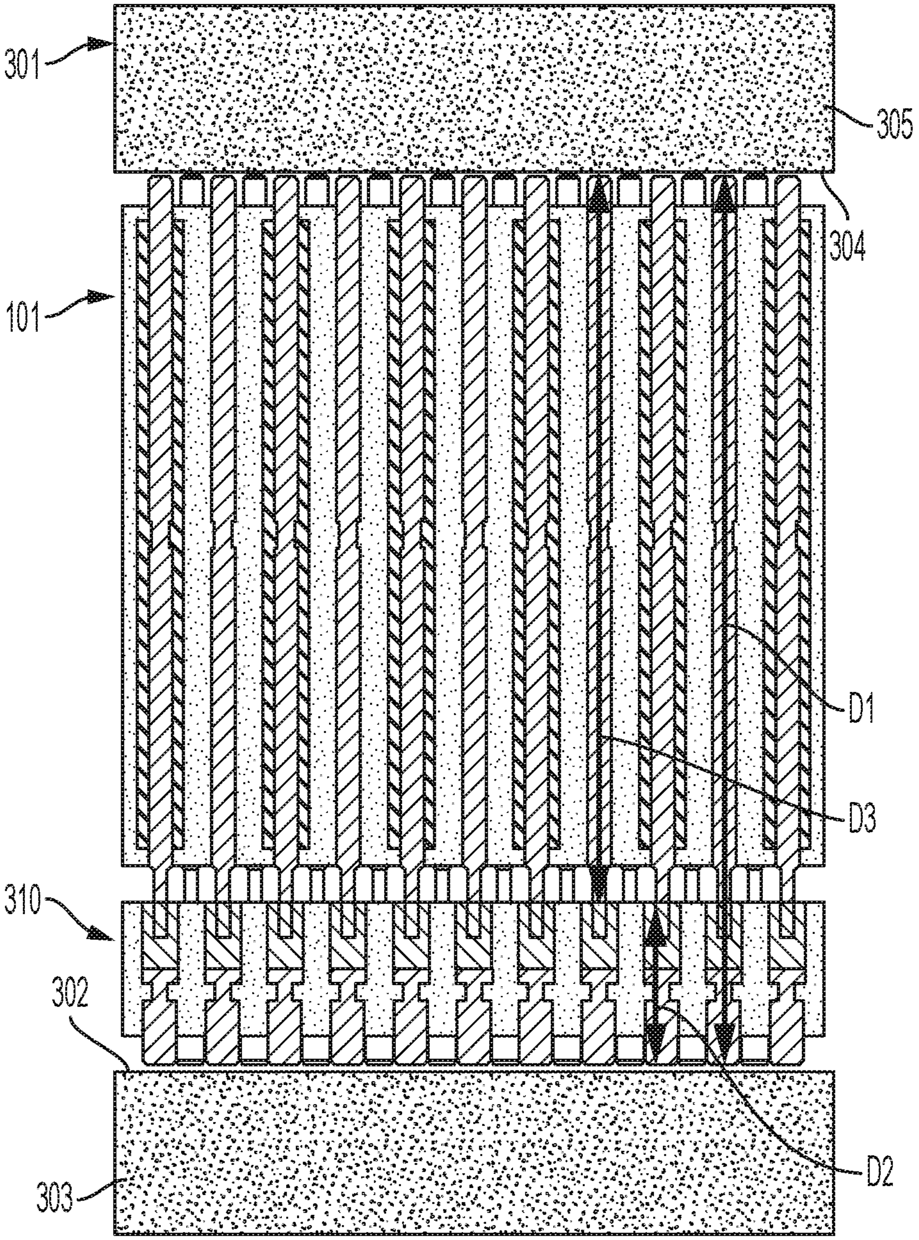
FIG. 3 is a side view of an electrical transition including the connector of FIGS. 1 and 2 in accordance with embodiments.

As shown in at least FIGS. 1 and 2 as well as FIG. 3, the connector 101 is electrically interposed, in an electrical transition 301, between a surface 302 of a first PCB 303 and an opposed surface 304 of a second PCB 305, where the surfaces 302 and 304 are separated from one another by a distance D1, to provide the desired impedance transition. In these or other cases, the connector 101 can span an entirety of the distance D1, or the electrical transition 301 can further include an additional connector assembly 310, which is electrically interposed with the connector 101 between the first PCB 303 and the second PCB 305.

In accordance with embodiments, the additional connector assembly 310 can be provided as a pin-to-pocket interface assembly or as another suitable device. The additional connector assembly 310 can be electrically interposed between the surface 302 of the first PCB 303 and a first end of the connector 101, as shown in FIG. 3 (where the surfaces 302 and 304 of the first and second PCBs 303 and 305 are separated from one another by a distance D1 and a corresponding length of the additional connector assembly is D2, and D1>D2), or may be provided in various alternative arrangements. These include, but are not limited to, the additional connector assembly 310 being electrically interposed between the surface 304 of the second PCB 305 and a second end of the connector 101 or the additional connector assembly 310 being electrically interposed between first and second sub-connector assemblies.

As shown in FIG. 2, the connector assembly 101 of FIGS. 1, 2 and 3, includes multiple RF signal pins 102 and groups $\mathbf{103}_{1,2,3,4,5}$ of the ground pins 103. Each of the signal pins 102 and each of the ground pins 103 extend at least partially along the distance between the first PCB 303 and the second PCB 305 (i.e., each of the signal pins 102 and each of the ground pins 103 extend along the distance D1-D2 and have corresponding lengths D3 (see FIG. 3) where D1=D2+D3). Each of the groups $\mathbf{103}_{1,2,3,4,5}$ of the ground pins 103 are arranged in a ring-shape $\mathbf{104}_{1,2,3,4,5}$ around a corresponding one of the multiple RF signal pins 102. The connector assembly 101 further includes the ground pin supporting mold 105 and the dielectric mold 106. The ground pin supporting mold 105 is formed about each ground pin 103 of each of the groups $\mathbf{103}_{1,2,3,4,5}$ of the ground pins 103 and is formed to define a borehole 107 around each one of the multiple RF signal pins 102. The dielectric mold 106 is formed in each borehole 107 about the corresponding one of the multiple RF signal pins 102 and about an exterior surface 105 of the ground pin supporting mold 105.

In accordance with embodiments, the multiple RF signal pins 102 can be arrayed in a linear formation 320. In these or other cases, the groups $\mathbf{103}_{1,2,3,4,5}$ of the ground pins 103 can form the ring-shapes $\mathbf{104}_{1,2,3,4,5}$ in a corresponding linear formation 321. In accordance with further embodiments, as shown in FIG. 2, neighboring ones of the multiple RF signal pins 102 can share intervening ground pins 103 of the corresponding neighboring groups $\mathbf{103}_{1,2,3,4,5}$ of the ground pins 103. Of course, it is to be understood that other formations are possible, such as where the multiple RF signal pins 102 are arrayed in a non-linear formation and/or where each one of the multiple RF signal pins 102 is surrounded by a corresponding one of the groups $\mathbf{103}_{1,2,3,4,5}$ of the ground pins 103 without sharing intervening ground pins 103.

Respective dimensions of the RF signal pins 102, the ground pins 103, the ground pin supporting mold 105 and the dielectric mold 106 may be sized to provide for the desired impedance transition. Particularly, an RF signal pin 102 diameter, a pitch between RF signal pins 102 and ground pins 103 and a dielectric channel diameter of the RF signal pins 102 may be sized for the desired impedance transition. For example, as shown in FIG. 2, the following equation establishes the ohmic characteristic $Z_o$ of each RF signal pin 102 is based on cross-sectional dimensions thereof:

$$Z_o=138*\log(D/d)/\varepsilon_R^{0.5},$$

where D is the diameter of the borehole 107, d is the diameter of the inner conductor of the RF signal pin 102 and $E_R$ is the dielectric constant of the dielectric mold 106. This clarifies that there is no limit on a length of the RF signal pins 102 while maintaining the desired impedance transition (e.g., a 50-ohm transition, for example, or another impedance transition), since the ohmic characteristic is based on only the cross-sectional dimensions.

With continued reference to FIGS. 1-3, the electrical transition 301 can further include digital signal pins 330. The digital signal pins 330 carry digital signals and are disposed at an exterior of each of the ring-shapes $\mathbf{104}_{1, 2, 3, 4, 5}$. The dielectric mold 106 is formed about the digital signal pins 330. In accordance with embodiments, as shown in FIG. 2, where the multiple RF signal pins 102 are arrayed in the linear formation 320, the digital signal pins can be arrayed in a corresponding liner formation 331 in parallel with the linear formation 320.

Figure 4:
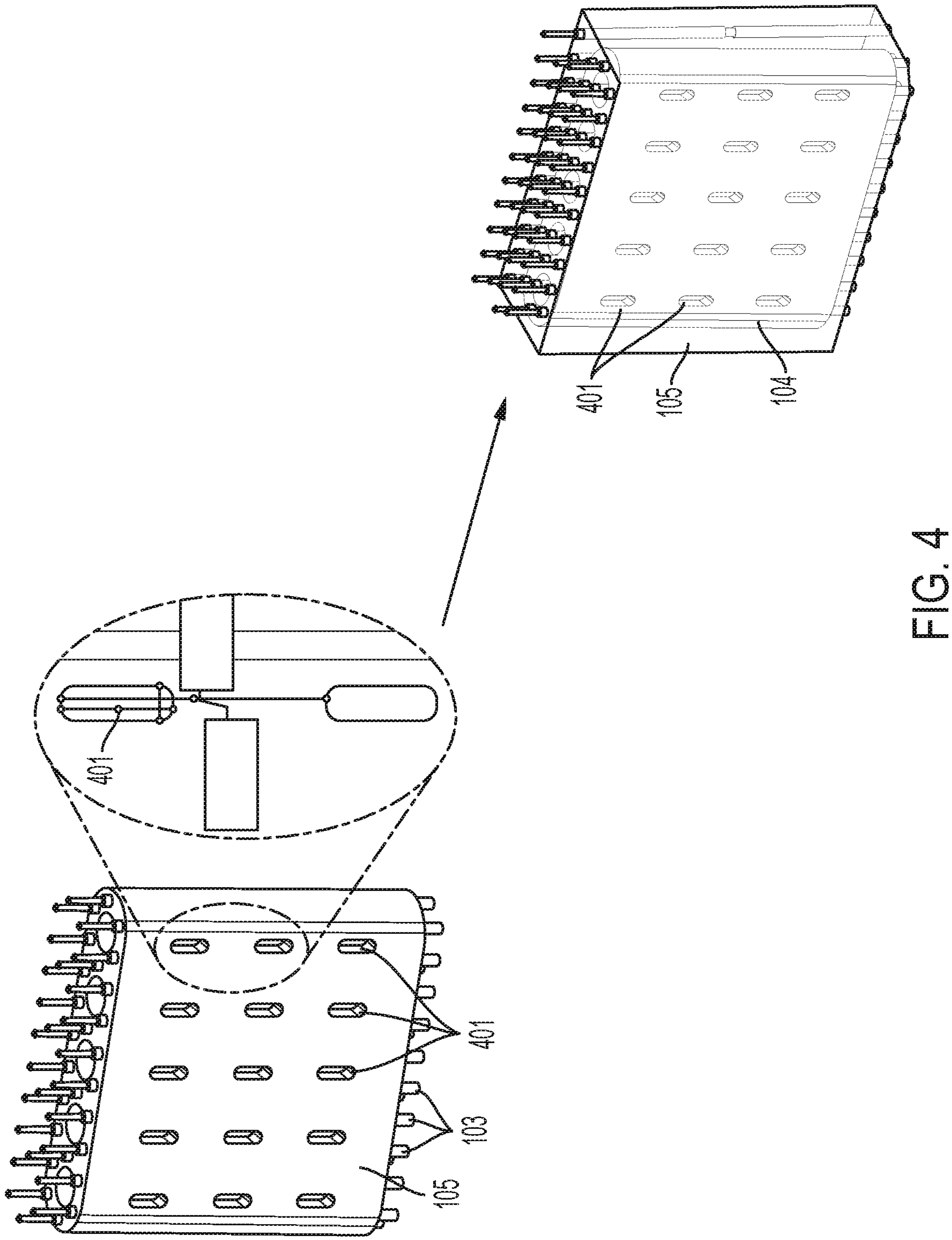
FIG. 4 is a perspective view illustrating a process of forming the connector of FIGS. 1-3 in accordance with embodiments.

With reference to FIG. 4, the ground pin supporting mold 105 can be formed of various types of conductive materials (i.e., in which case the ground pin supporting mold 105 can be referred to as a "conductive mold 105"). These include, but are not limited to, at least one of conductive polymeric material (e.g., Coolpoly E-Series™) and a conductive powder material in a dielectric matrix (such as powdered silver in an epoxy matrix). The dielectric mold 106 can be formed of any suitable dielectric material (e.g., TPX™). In any case, the ground pin supporting mold 105 and the dielectric mold 106 can be formed by injection molding or another suitable process. To this end, the ground pin supporting mold 105 can include cutouts 401. The cutouts 401, which are also illustrated in FIG. 2, allow for a flow of a liquid form of the material of the dielectric mold 106 to flow into each borehole 107 prior to being cured or hardened into the dielectric mold 106.

Figure 5:
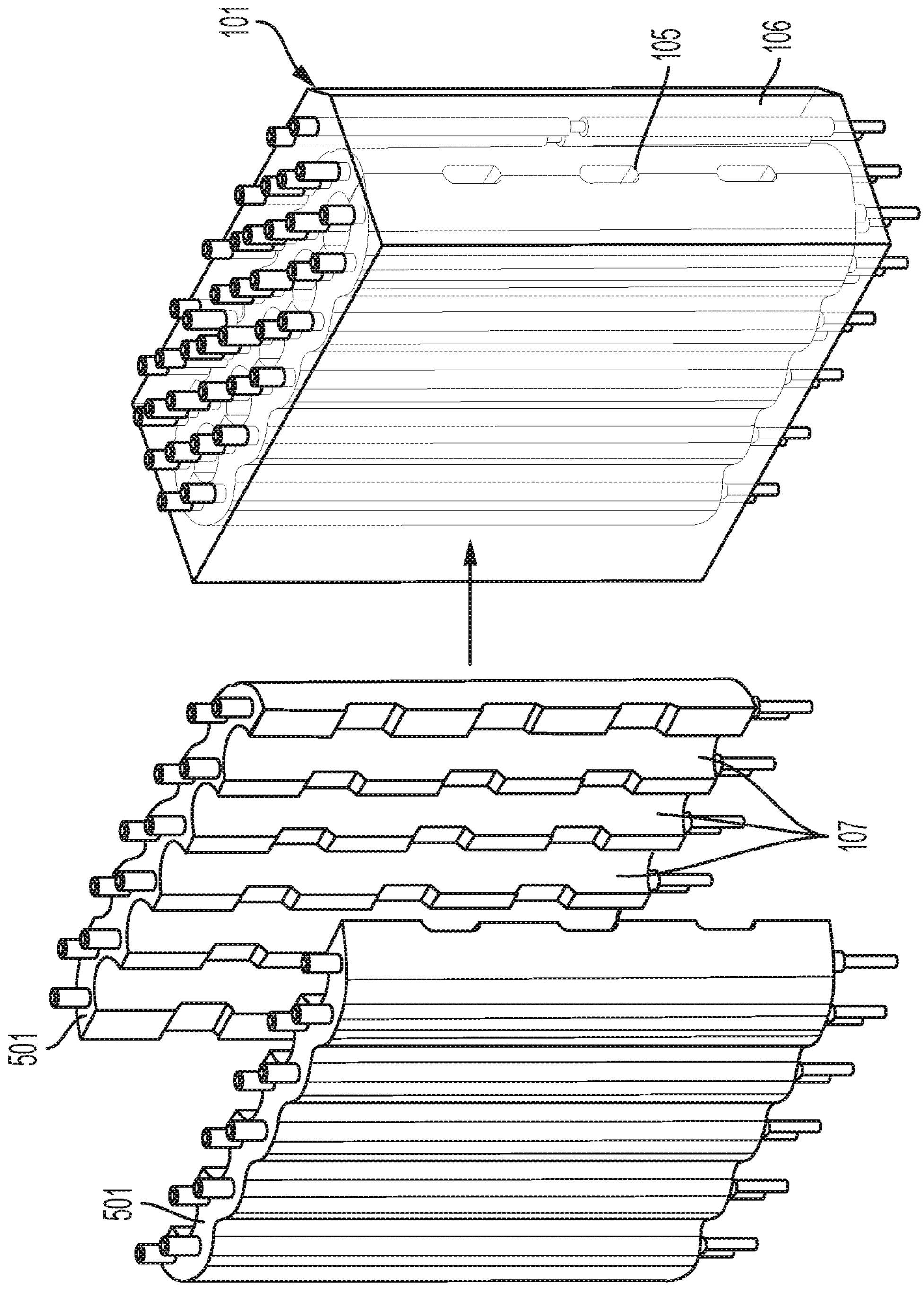
FIG. 5 is a perspective view illustrating a process of forming the connector of FIGS. 1-3 in accordance with embodiments.
Figure 6:
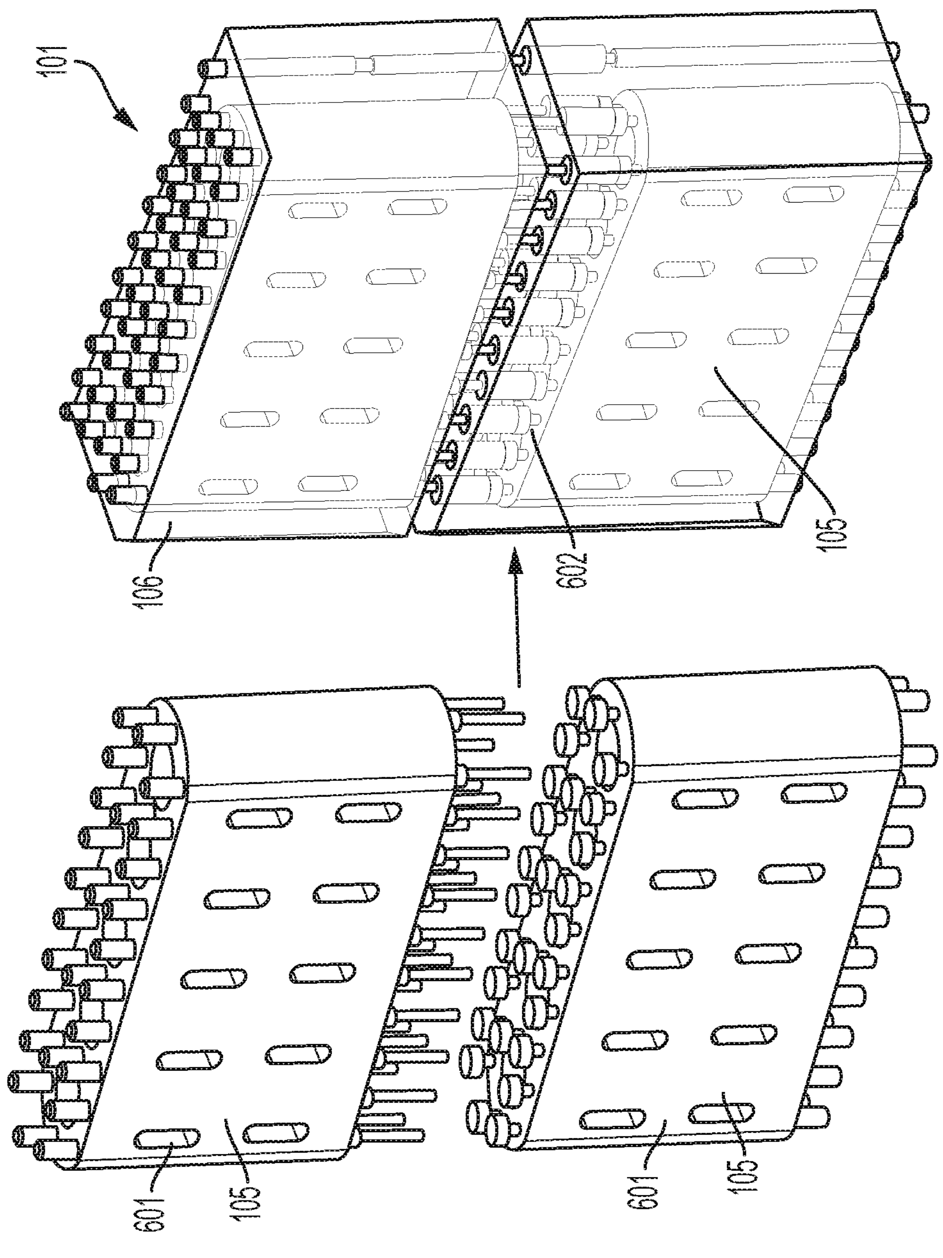
FIG. 6 is a perspective view illustrating a process of forming the connector of FIGS. 1-3 in accordance with embodiments.

With reference to FIGS. 5 and 6, additional methods are provided for forming the connector 101. For example, as shown in FIG. 5, the ground pin supporting mold 105 can be formed as separate portions 501 that can be joined or bonded together. Prior to such joining or bonding, an interior surface of each borehole 107 of each separate portion 501 can be plated (e.g., with a conductive material, such as metal or a metal alloy). The separate portions 501 can be half-portions of the ground pin supporting mold 105 as shown in FIG. 5 or the separate portions can be smaller or alternative divisions of the ground pin supporting mold 105. As shown in FIG. 6, multiple pre-connectors 601 can be formed as described herein and bonded with one another to form a bonded pre-connector about which the dielectric mold 106 is formed. Each of the multiple pre-connectors 601 includes the groups $\mathbf{103}_{1, 2, 3, 4, 5}$ of the ground pins 103 (see FIG. 2) and the ground pin supporting mold 105. Neighboring ones of the pre-connectors 601 can be bonded via an intervening connection 602.

Here it is to be understood that intervening connection 602 can be provided as the additional connector assembly 310 of FIG. 3. In this case, neighboring pre-connectors would be linked via pin-in-pocket connections mentioned above, but not necessarily a bonding process. That is, the above-mentioned sputtering refers to a type of plating process (not bonding). In this design, sputtering would be used to plate the boreholes 107 and this is made possible because the borehole length is split between the two parts (i.e., the hole is now shallow enough to allow for sputtering).

Figure 7A:
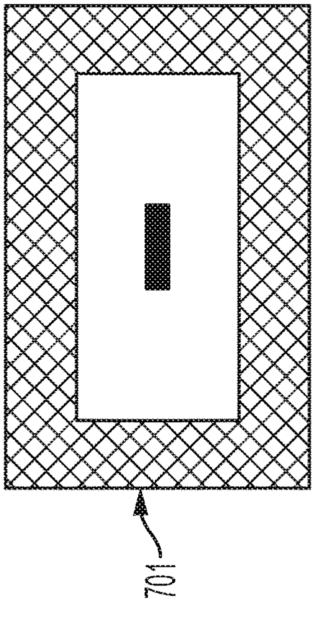
FIGS. 7A, 7B and 7C are schematic diagrams illustrating various configurations of an electrical connector in accordance with embodiments.
Figure 7B:
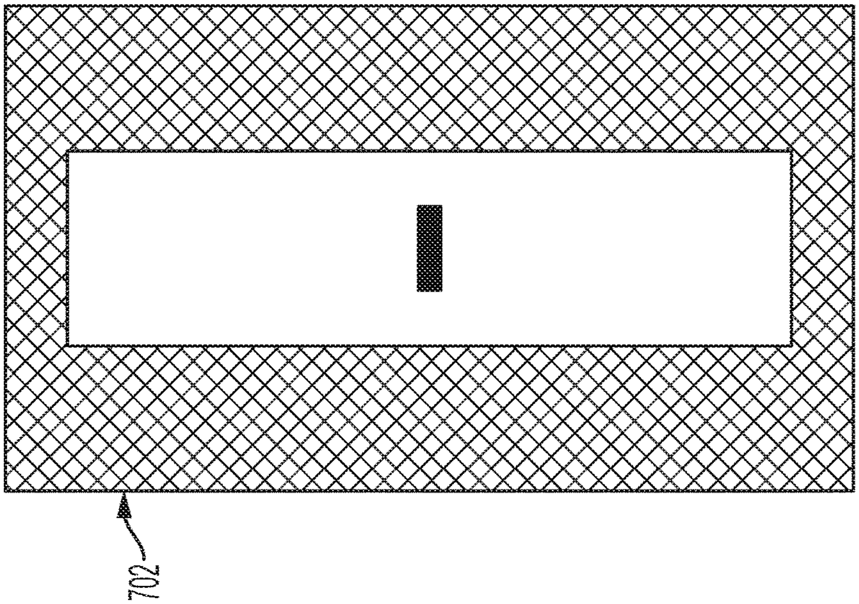
Figure 7C:
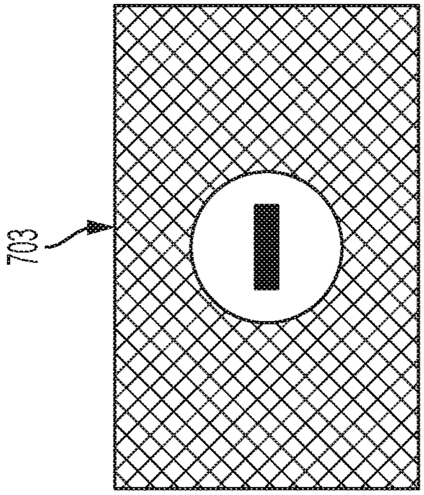

Although the description provided above relates to electrical transitions of certain shapes, it is to be understood that other embodiments are possible. With reference to FIGS. 7A, 7B and 7C, these other embodiments include, but are not limited to, rectangular waveguide configurations 701, quasi-coplanar waveguide (quasi-CPW) configurations 702 and circular waveguide configurations 703.

Figure 8:
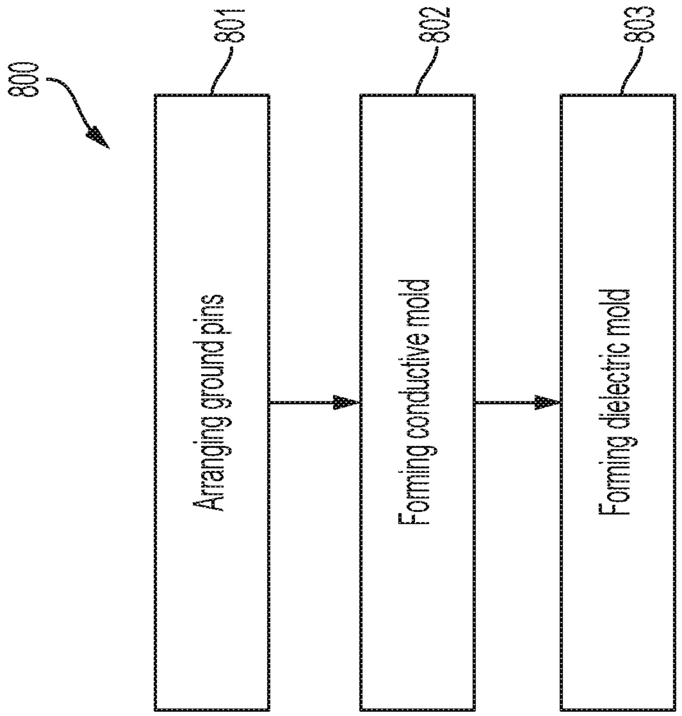
FIG. 8 is a flow diagram illustrating a method of forming a connector in accordance with embodiments.

With reference to FIG. 8, a method 800 of forming a connector, such as the connector 101 described above, is provided. The method 800 includes arranging ground pins in a ring-shapes around radio frequency (RF) signal pins at block 801, forming (e.g., by injection molding or another suitable process) a ground pin supporting mold, which can be formed of conductive material or material to which conductive material can be added, about the ground pins to define boreholes around each of the RF signal pins at block 802 and forming (e.g., by injection molding or another suitable process) a dielectric mold in the boreholes about each of the RF signal pins and about the ground pin supporting mold at block 803. As noted above, the ground pin supporting mold can be formed of various types of conductive materials or materials to which conductive materials can be added. These include, but are not limited to, at least one of conductive polymeric material (e.g., Coolpoly E-Series™) and a conductive powder material in a dielectric matrix, such as powdered silver in an epoxy matrix). The dielectric mold 106 can be formed of any suitable dielectric material (e.g., TPX™).

The method 800 can further include arranging digital signal pins at an exterior of the ring-shape and forming the dielectric mold about the digital signal pins as described above with reference to FIG. 2. In addition, the method 800 can include forming the ground pin supporting mold in separate portions, such as halves, and plating an interior surface of each borehole as described above with reference to FIG. 5 (would also plate/sputter the interior surface of boreholes in FIG. 6).

Figure 9:
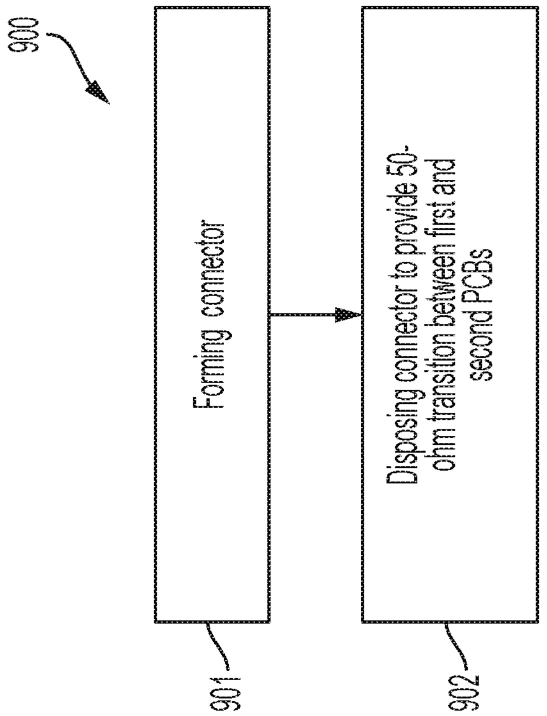
FIG. 9 is a flow diagram illustrating a method of assembling an electrical transition including a connector in accordance with embodiments.

With reference to FIG. 9, a method 900 of assembling an electrical transition, such as the electrical transition 301 described above, is provided. The method 900 includes forming the connector, such as the connector 101 described above, at block 901, and disposing the connector to provide a desired impedance transition (e.g., a 50-ohm transition) between first and second PCBs at block 902. The method 900 can further include electrically interposing an additional connector assembly between the first and second PCBs as described above with reference to FIG. 3.

Technical effects and benefits of the present disclosure are the provision of an overmold-overmold connector body that enables the creation of a micro-coax that is completely tailorable in size and in numbers of interconnects. The overmold-overmold process creates a solid ground feature that eliminates issues experienced with coaxial ground cage designs that cause resonances beyond a certain connector length. The solid ground feature does not have connector length restrictions. The overmold-overmold process also enables a cost-effective method to combine RF, digital and/or high-speed digital signals into one connector, with excellent isolation capabilities and excellent signal integrity characteristics.

While the disclosure is provided in detail in connection with only a limited number of embodiments, it should be readily understood that the disclosure is not limited to such disclosed embodiments. Rather, the disclosure can be modified to incorporate any number of variations, alterations, substitutions or equivalent arrangements not heretofore described, but which are commensurate with the spirit and scope of the disclosure. Additionally, while various embodiments of the disclosure have been described, it is to be understood that the exemplary embodiment(s) may include only some of the described exemplary aspects. Accordingly, the disclosure is not to be seen as limited by the foregoing description, but is only limited by the scope of the appended claims.

What is claimed is:

1. An overmold-overmold connector, comprising:

one or more radio frequency (RF) signal pins;

ground pins arranged in a ring-shape around the one or more RF signal pins;

a ground pin supporting mold formed about the ground pins and defining a borehole around the one or more RF signal pins; and a dielectric mold formed in the borehole about the one or more RF signal pins and about the ground pin supporting mold.

2. The connector according to claim 1, wherein respective dimensions of the one or more RF signal pins, the ground pins, the conductive mold and the dielectric mold are sized to provide for a desired impedance transition.

3. The connector according to claim 1, further comprising digital signal pins at an exterior of the ring-shape, wherein the dielectric mold is formed about the digital signal pins.

4. The connector according to claim 1, wherein the ground pin supporting mold comprises at least one a conductive polymeric material and a conductive powder material in a dielectric matrix.

5. The connector according to claim 1, wherein the ground pin supporting mold is formed to define cutouts for a flow of material of the dielectric mold.

6. The connector according to claim 1, further comprising plating on an interior surface of the borehole.

7. A radio frequency (RF) electrical transition of a connector, comprising:

first and second printed circuit boards (PCBs); and a connector disposed to provide a desired impedance transition between the first and second PCBs, the connector comprising:

radio frequency (RF) signal pins extending at least partially between the first and second PCBs;

groups of ground pins extending at least partially between the first and second PCBs, each group of ground pins being arranged in a ring-shape around a corresponding one of the RF signal pins;

a ground pin supporting mold formed about each ground pin of each of the groups of the ground pins and defining a borehole around each one of the RF signal pins; and a dielectric mold formed in each borehole about the corresponding one of the RF signal pins and about the ground pin supporting mold.

8. The connector according to claim 7, wherein respective dimensions of the RF signal pins, the ground pins, the ground pin supporting mold and the dielectric mold are sized to provide for the desired impedance transition.

9. The connector according to claim 7, further comprising digital signal pins at an exterior of each of the ring-shapes, wherein the dielectric mold is formed about the digital signal pins.

10. The connector according to claim 7, wherein the ground pin supporting mold comprises at least one of conductive polymeric material and a conductive powder material in a dielectric matrix.

11. The connector according to claim 7, wherein the ground pin supporting mold is formed to define cutouts for a flow of material of the dielectric mold.

12. The connector according to claim 7, further comprising plating on an interior surface of each borehole.

13. The connector according to claim 7, further comprising an additional connector assembly electrically interposed between the first and second PCBs.

14. A method of forming an overmold-overmold connector, the method comprising:

arranging ground pins in a ring-shapes around radio frequency (RF) signal pins;

forming a ground pin supporting mold about the ground pins to define boreholes around each of the RF signal pins; and forming a dielectric mold in the boreholes about each of the RF signal pins and about the ground pin supporting mold.

15. The method according to claim 14, further comprising:

arranging digital signal pins at an exterior of the ring-shape; and forming the dielectric mold about the digital signal pins.

16. The method according to claim 14, wherein the ground pin supporting mold comprises at least one of conductive polymeric material and a conductive powder material in a dielectric matrix.

17. The method according to claim 14, wherein the forming of the ground pin supporting mold and the forming of the dielectric mode comprises injection molding.

18. The method according to claim 17, wherein the injection molding comprises:

forming the ground pin supporting mold in separate portions; and plating an interior surface of the borehole.

19. A method of assembling an electrical transition of a connector, the method comprising:

forming the overmold-overmold connector, the method comprising:

arranging ground pins in a ring-shapes around radio frequency (RF) signal pins;

forming a ground pin supporting mold about the ground pins to define boreholes around each of the RF signal pins; and forming a dielectric mold in the boreholes about each of the RF signal pins and about the ground pin supporting mold; and disposing the connector to provide a desired impedance transition between first and second printed circuit boards (PCBs).

20. The method according to claim 19, further comprising electrically interposing an additional connector assembly between the first and second PCBs.

* * * * *